United States Patent

[11] 3,588,446

| [72] | Inventors | Edwin R. Mills<br>Raleigh;<br>Ernest L. Elmore, Smithfield, N.C. |
|---|---|---|
| [21] | Appl. No. | 803,644 |
| [22] | Filed | Mar. 3, 1969 |
| [45] | Patented | June 28, 1971 |
| [73] | Assignee | Fieldcrest Mills, Inc.<br>Eden, N.C. |

[54] ELECTRICALLY HEATED BEDCOVER AND POWER MODULATING CONTROL CIRCUITS THEREFOR
11 Claims, 10 Drawing Figs.

| [52] | U.S. Cl. | 219/501 |
| [51] | Int. Cl. | H05b 1/02 |
| [50] | Field of Search | 219/501, 505, 212, 511 |

[56] References Cited
UNITED STATES PATENTS

| 3,423,567 | 1/1969 | Mills | 219/212 |
| 3,462,585 | 8/1969 | Somers | 219/501 |
| 3,467,817 | 9/1969 | Fricker | 219/501 |

*Primary Examiner*—Harold Broome
*Attorney*—Parrott, Bell, Seltzer, Park and Gibson ABSTRACT: An electrically heated bedcover such as a blanket wherein the average power delivered to a heating circuit including an electrical heating element in the blanket is modulated in response to low current level gating signals applied to a gate control element of a semiconductor switching means by varying the conduction angle thereof, and wherein the gating signals are applied by a gating signal means including at least one positive temperature coefficient resistance device responsive to a temperature indicative of the comfort of a user of the blanket for varying the resistance of the gating circuit.

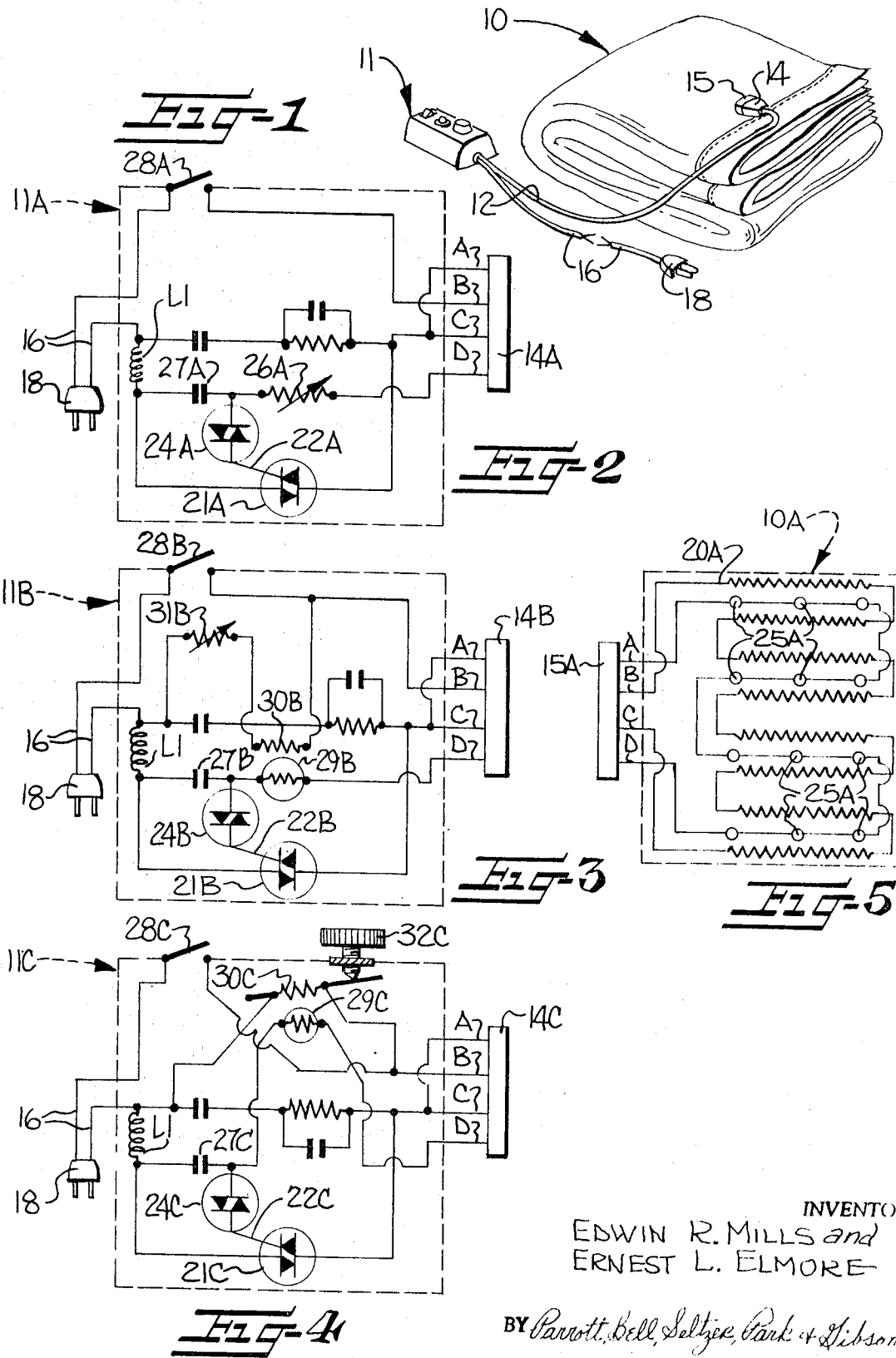

INVENTORS:
EDWIN R. MILLS and
ERNEST L. ELMORE

BY Parrott, Bell, Seltzer, Park & Gibson
ATTORNEYS

INVENTORS:
EDWIN R. MILLS and
ERNEST L. ELMORE

BY Parrott, Bell, Seltzer, Park & Gibson

ATTORNEYS

ELECTRICALLY HEATED BEDCOVER AND POWER MODULATING CONTROL CIRCUITS THEREFOR

Electrically heated bedcovers, such as electric blankets, resemble conventional bedcovers but include an electrical heating element, such as a resistance wire disposed therein at the time of manufacture or threaded through channels formed therein at the time of manufacture, to which voltage is applied to cause the element to heat and thereby provide warmth for a user.

In conventional commercial practice, control over the temperature reached by an electrically heated bedcover has been attained by cycling the application of voltage to the heating element during the time that the bedcover is in use. By controllably varying the intervals of time during which voltage is applied to and removed from the heating element, the power delivered to the heating element is averaged to control the rate of heat generation by the heating element. Typically, the on and off cycling of voltage applied to the electrical heating element is controlled by a bimetallic thermostatic switch connected in series with the heating element and controllably biased by a user for setting the temperature reached by the blanket.

It is recognized that such control over average power has deficiencies and that certain difficulties in the use of electrically heated bedcovers are normally encountered due to the on and off cycling of voltage. For example, users of such bedcovers are aware that the relatively heavy-duty thermostatic switches usually employed are somewhat noisy in operation and arc upon opening, due to the necessary use of a snap action type of device for interrupting the relatively high voltage and current flowing in and to the electrical heating element. Further, while the degree of control possible to achieve through the use of such thermostatic switches has been commercially acceptable heretofore, such control is not as accurate as is desirable.

Attempts have been made heretofore to utilize a silicon controlled rectifier (SCR) in place of such a bimetallic thermostatic switch, with the SCR being controlled by negative temperature coefficient resistance devices. While such attempts obviate the aforementioned noise and arcing problems encountered with the bimetallic thermostatic switches, other problems and deficiencies are present in such SCR control circuits. For example, such SCR control circuits require specially designed heating elements different from those heretofore employed in electrically heated bedcovers and therefore such SCR control circuits may not be employed with a conventional electric blanket or other electrically heated bedcover. Additionally, such SCR control circuits have only a limited range of control over the average power delivered to the heating elements, even with the specifically designed heating elements, and accordingly cannot properly accommodate wide variances in ambient temperature conditions or user demands. Also, failure of the negative temperature coefficient resistance devices of such SCR control circuits results in an unsafe condition which is likely to lead to dangerous overheating since such failure will result in a continuous demand that power be delivered to the heating element of the bedcover.

In view of the above, it is an object of the present invention to provide a power control circuit for use in conjunction with an electrically heated bedcover such as a blanket wherein the average power delivered to an electrical heating element in the blanket is accurately and smoothly modulated, without encountering the difficulties and problems heretofore typical of such circuitry. In realizing this object of the present invention, a bidirectional semiconductor, gate controlled, switching means controls the passage of portions of both half cycles of an alternating line current to modulate the average power delivered to the electrical heating element of an electrically heated bedcover in response to a modulated, low current, level, gating signal. By gradual variation of the phase relation of the relatively low current level gating signal to the alternating line current applied to the switching means, a gradually changing or modulated control of exceptionally wide range is exercised over the average power delivered to the blanket heating element while retaining the alternating current characteristics considered in the design of conventional blanket heating elements.

Another object of this invention is the provision of control circuitry for an electrically heated bedcover including a semiconductor, gate controlled switching means controlled by a positive temperature coefficient resistance device, wherein possible dangerous overheating by continuation of power delivery to the heating element is prevented upon failure of the resistance device.

Some of the objects and advantages of the invention having been stated, others will appear as the description proceeds when taken in connection with the accompanying drawings, in which:

FIG. 1 is a perspective view of an electric blanket and control means of this invention;

FIGS. 2, 3 and 4 are schematic drawings of respective first, second and third forms of control means in accordance with this invention;

FIG. 5 is a schematic drawing of a first form of electric blanket wiring in accordance with this invention for use with the control means of FIGS. 2, 3 and 4;

Figure 6:
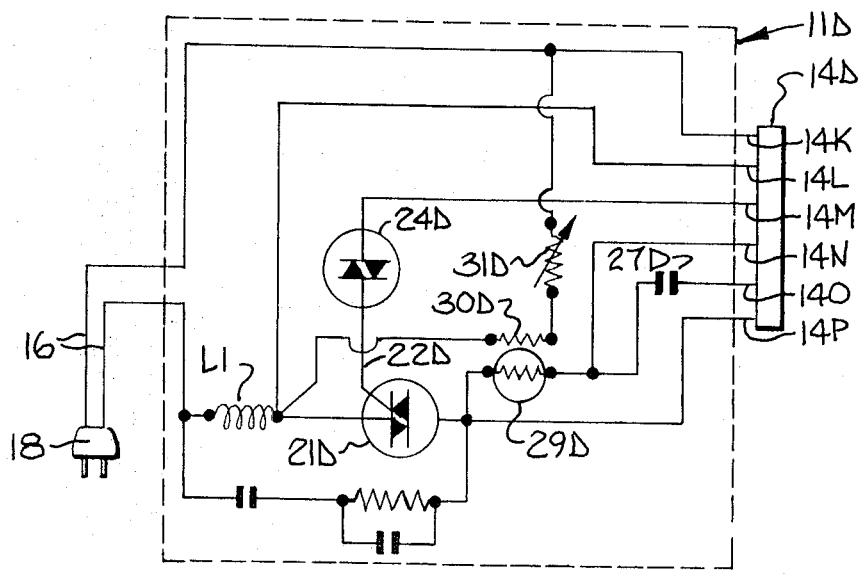
FIG. 6 is a schematic drawing of a fourth form of control means in accordance with this invention.

Referring now more particularly to the drawings, the electrically heated bedcover of this invention includes a blanket generally indicated at 10 and control means therefor generally indicated at 11 (FIG. 1) which are electrically connected together during use of the blanket. In use, the blanket is typically spread upon a bed and the control means placed at a location convenient for the user, such as a night stand beside the bed.

The circuitry within the control means 11 and that within the blanket 10 are joined together by a suitable multiconductor cable 12, comprising two or more conductors or wire as may be required. Mating connectors 14, 15 are provided for the cable 12, in order that the control means 11 and the blanket 10 may be separated when not in use, as for storage. Connection of the electrical circuitry with an appropriate source of line voltage is made by means of a line conductor cable 16 terminating in a plug 18 adapted to be fitted to a wall receptacle or socket.

Figure 7:
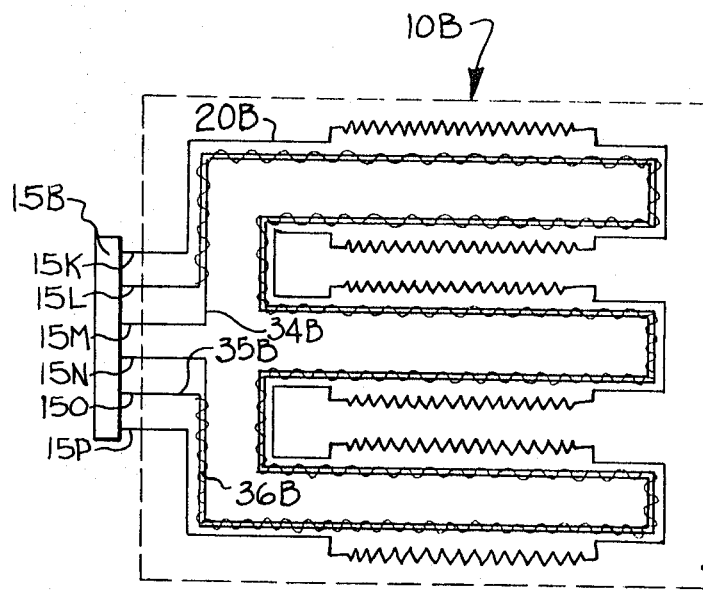
FIG. 7 is a schematic drawing of a second form of electric blanket wiring in accordance with this invention, for use with the control means of FIG. 6.
Figure 8:
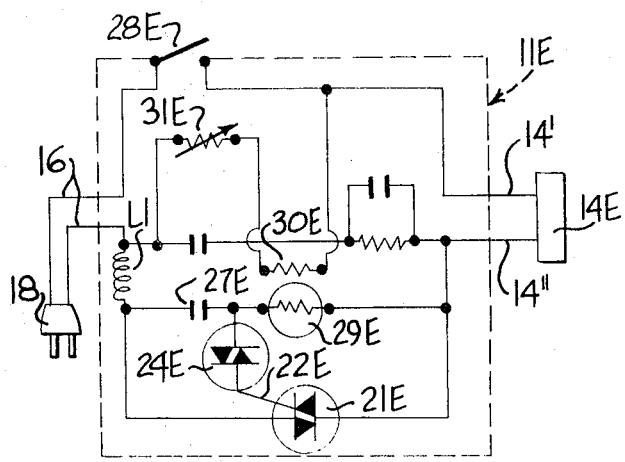
FIGS. 8 and 9 are schematic drawings of respective fifth and sixth forms of control means in accordance with this invention.
Figure 10:
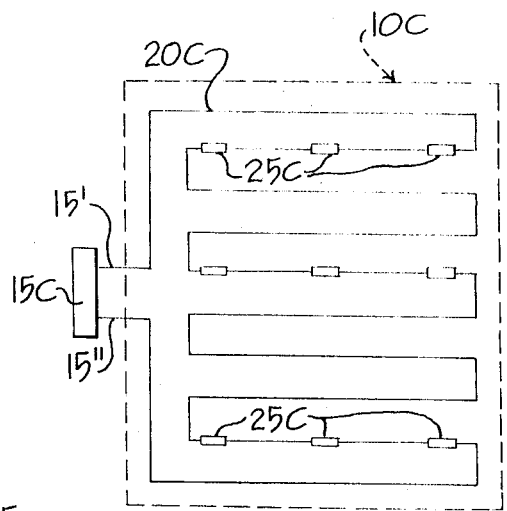
FIG. 10 is a schematic drawing of a third form of electric blanket wiring in accordance with this invention for use with the control means of FIGS. 8 and 9.
Figure 9:
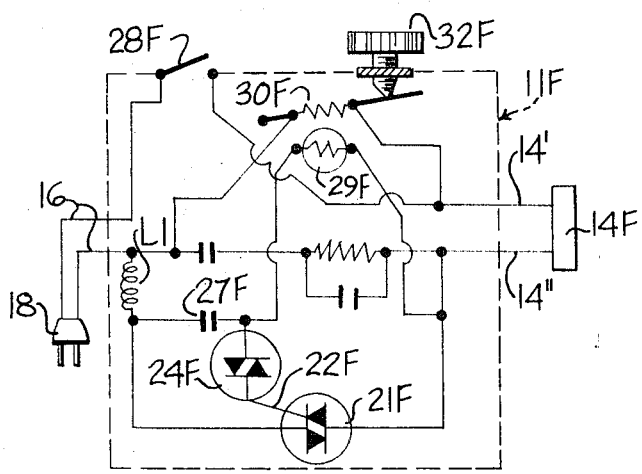

Inasmuch as the present invention contemplates that the electrical circuitry within the control means 11 and the blanket 10 may take several forms, schematic wiring diagrams have been included (FIGS. 2—10) which illustrate a number of circuit arrangements. Reference characters for the blanket 10 and the control means 11 have been used throughout those diagrams with the addition of postscript letter designations to identify the various forms discussed hereinafter. For purposes of an initial discussion, reference is made to the circuitry of a first form for the control means, namely the means 11A (FIG. 2), and of a first form for the blanket, namely the blanket 10A (FIG. 5).

The circuitry included in the electrically heated bedcover may be generally subdivided into a main heating circuit including an electrical heating element 20A in the blanket 10A and a semiconductor, gate controlled, switching means 21A operable between conductive and nonconductive states and at varying conduction angles for controlling the average power delivered to the heating element 20A and, in conjunction with the main heating circuit, a gating signal means operatively connected to a gate control element 22A of the semiconductor switching means 21A for applying gating signals thereto. Turning first to the main heating circuit, the electrical heating element 20A and the semiconductor switching means 21A are connected in series through pairs of conductors 14', 14" and 15', 15" included in the four-conductor cable 12, so that operation of the semiconductor switching means 21A at varying conduction angles controls the power delivered to the heating element 20A.

Preferably, the gate controlled semiconductor switching means 21A is a thyristor, such as a Triac, gated biswitch, a Quadrac, a symistor, or some other similar device. The Triac is a commercially available thyristor or gate controlled bidirectional conducting switch manufactured and sold by the General Electric Company. While a more detailed description of the characteristics of such a device can be obtained from technical publications available from manufacturers of thyristors, a brief description is thought to be adequate for the purpose of this disclosure.

Such a semiconductor switching mean conducts current in either of two directions, depending upon the polarity of the potential across its terminals. If the potential of one terminal is positive with respect to the other, the thyristor will conduct current in the appropriate direction. If, on the other hand, the potential of the other terminal is positive with respect to the potential of the first terminal, the semiconductor switch means will conduct current in the appropriate opposite direction.

The bidirectional semiconductor switch device 21A is triggered into a conducting state by a low current level gating signal applied to its control gate element 22A. Once triggered into conduction, the device remains conducting until the current flowing therethrough is reduced below a known minimum holding current value, a characteristic known as latching. The switching device is turned off automatically as an alternating current line voltage applied thereto passes through a zero value region where the current through the switching device drops below the minimum holding value and the device automatically turns off.

In order to apply relatively low current and voltage gating signals to the gate control element 22A of the semiconductor switching means 21A, the circuitry of the electrically heated bedcover further includes a gating signal means operatively connected to the gate control element 22A. It is a characteristic of thyristors and of other related semiconductor switching means that triggering the same into conduction requires the application of at least a certain minimum voltage with at least a certain minimum current flow to and through the gate control element. Thus, it is important that the gating signal means apply to the switching means 21A a signal of proper current and voltage magnitude. Further, in order to accomplish a modulation of the average power delivered through the semiconductor switching means 21A to a heating element 20A in the blanket 10A, in accordance with the present invention, it is necessary that the signal delivered be presented in a particular time or phase relationship.

More specifically, it is known that a bidirectional semiconductor switching means may be employed to substantially infinitely vary the portions of a cycle of alternating current passed therethrough, by triggering the device into a conductive state at any given angle during the first 180° or positive half cycle and during the second 180° or negative half cycle of alternating current applied thereto. In the usual analysis of such operation, the sine wave of the cycle of alternating current is considered to extend over 360°, and the phase relation or angle at which conduction of the semiconductor switching means is initiated relative to the next preceding zero crossing is referred to as the firing angle or conduction angle. Modulation of the average power delivered through a semiconductor switching means is accomplished by variation of the conduction angle and, with a bidirectional conducting device, such time or phase related variations in the firing angle will permit modulation of the average power from approximately zero percent of that possible to be delivered to approximately one hundred percent of that possible to be delivered.

These characteristics of a bidirectional semiconductor switching means such as a thyristor and a phase related gating signal control over the conduction angle of the switching means contribute in at least two important ways to major advantages of the control circuits of the present invention. First, conduction of controlled portions of both half cycles of an alternating line current facilitates adaption of the power control circuits of the present invention to electrical heating resistance wire as has heretofore been used in conventional electrical blankets. Thus, manufacturers of electrical blankets in accordance with the present invention need not revise the design standards heretofore applied in the production of heating elements. Further, conduction of controlled portions of each half cycle facilitates obtaining a greater wattage output of heat from the heating element than would be the case were a rectified current or only a portion of only one-half cycle of the alternating line current conducted to the heating element. Finally, the full range control over percentage of average power delivered made possible by variation of the conduction angle over substantially the entire cycle of alternating line current insures that operation of the electrically heated bedcover will be proper even in conditions of widely varying ambient temperature conditions and user demands.

In applying time varying or phase related gating signals to the gate control element 22A of the semiconductor switching means 21B, the gating signal means of the present invention includes timing circuit components for establishing a particular time relationship and a triggering device for governing the application of a gating signal to the semiconductor switching means. In the illustrated circuit embodiments, the triggering device is a voltage control bidirectional diode 24A, which appropriately may be a Diac as manufactured by the General Electric Company. In contrast to thyristors, such as the semiconductor switching means 21A, a control bidirectional diode is voltage sensitive and current insensitive. That is, the control bidirectional diode blocks the passage of any voltage or current until the voltage present across the diode exceeds at least a certain predetermined value, such as 40 volts. Upon the voltage impressed across the control bidirectional diode reaching predetermined level, the control bidirectional diode breaks down, or enters a conductive state, to pass a gating signal to the semiconductor switching means 21A. While a control bidirectional diode 24A is shown as the triggering device, it is to be recognized that other circuit components may be useful as the triggering device, such as a gaseous discharge lamp or the like, provided that the characteristic of blocking current flow until at least a predetermined voltage is applied is present.

In order to control the rise time of voltage impressed across the control bidirectional diode 24A, and thereby establish a phase relationship between the conduction of a triggering gating signal and the line current applied to the semiconductor switching means 21A, the triggering device is connected into a resistance-capacitance timing circuit (R-C circuit). As is known from basic alternating current circuit design, a capacitor in an R-C circuit is charged during each half cycle of alternating line current applied thereto, with the rise time of voltage appearing across the capacitor lagging behind the rise time of the impressed alternating line current to a degree or phase angle determined by the particular resistance-capacitance values present in the R-C circuit, By varying one or the other of the values, the particular rise time of the voltage across the capacitor may be controlled.

By the combination of the R-C timing circuit and the triggering device in the gating signal means of the power modulating control circuits of the present invention, the rise time of voltage applied to the triggering device is determined by the relative values of resistance and capacitance in a circuit including overheat protection devices 25A in the blanket 10A, a variable resistance 26A in the control means 11A, and a timing capacitor 27A. With variation in the rise time of the voltage impressed across the control bidirectional diode 24A from the capacitor to the gate element 22A of the switching means, the phase relationship between the gating signal applied on breakdown of the triggering device and the alternating line current applied to the semiconductor switching means is varied and the conduction angle of the switching means is thus controlled.

The resistance present in the R–C timing circuit portion of the gating signal means is determined at least in part by the setting of the variable resistor 26A. Thus, the variable resistor provides a means for a user of the blanket to controllably determine the degree of warmth obtained. The resistance varying means further includes at least one positive temperature coefficient resistance device responsive to a temperature indicative of the comfort of the user of the bedcover, for increasing the resistance of the gating signal means upon exposure thereof to a rise in temperature.

In a bedcover wherein the circuitry includes the control means 11A and the blanket 10A (of FIGS. 2 and 5), a plurality of positive temperature coefficient resistance devices 25A are disposed substantially throughout the heated area of the blanket 10A so as to be responsive to the temperature thereof. The devices 25A are connected by means of conductors B and c of the cable 12 to a variable resistance device 26A and to a timing capacitor 27A, with the triggering device being connected to the R–C circuit thus provided at a point between the resistors and the capacitor. In this circuit arrangement, the positive temperature coefficient resistance devices 25A are responsive to the temperatures attained by the blanket 10A, both during normal operation of the blanket to warm a user thereof and in the event of a localized overheating condition as may occur should the blanket become bunched, folded, or covered by a material of good thermal insulating quality such as another blanket or a bedspread.

In any such event, rising temperature in the blanket 10A increases the resistance of one or more of the resistance devices 25A, thereby delaying the rise of the voltage on the timing capacitor 27A, changing the phase relation between the line current and the gating signals and varying the conduction angle of the semiconductor switching device 21A to modulate downward the average power delivered to the heating element 20A. By adjustment of a set point variable resistance 26A, a user of the blanket 10A may controllably vary the resistance of the gating signal circuit and thus the phase relation of the gating signals.

In accordance with an important feature of the present invention, the overheat protective means provided by the resistance devices 25A is fail-safe. That is, failure of one of the temperature sensitive elements 25A results in no current being delivered to the associated blanket heating element 20A through the semiconductor switching means 21A, inasmuch as no gating signals are applied. Thus, a user of the electrically heated bedcover is protected against possible injury otherwise occurring from an overheated condition even in the event of failure of the circuit elements normally operative to protect against such an occurrence. Protection provided in this manner is understandably of particular importance for the safety of users of the electrically heated bedcover of the present invention.

In operation of a bedcover in accordance with the present invention, using the control means 11A and the blanket 10A circuitry described to this point, heating is initiated by closing a line voltage switch 28A to apply line voltage to the main heating and gating signal circuits. If the room temperature and setting are such as to call for added warmth, the semiconductor switching device 21A begins delivering power to the electrical heating element 20A of the blanket 10A, by conducting substantially the entire waveform of the alternating line current, or a controlled portion thereof, to the main heating circuit.

As the temperature attained in the blanket 10 approaches the set point temperature established by the variable resistor 26A, the total resistance of the gating signal circuit including that resulting from the variable resistor 26A and the positive temperature coefficient resistance devices 25A becomes such that the phase relation of the signals applied to the gate control element 22A of the semiconductor switching device 21A, through the bidirectional diode 24A, is varied, the conduction angle of the switching device changes, and reduced portions of the cycles of alternating current are conducted through the switching device. As the portions of the cycles of alternating line current being conducted through the main circuit are thus reduced, the average power delivered to the heating element 20A is modulated downward in a smooth and controlled fashion.

Upon the rate of heat generation in the main heating element 20A of the blanket 10A becoming balanced with ambient temperature conditions so as to maintain the desired temperature beneath the blanket, the conduction angle of the semiconductor switching means and the average power delivered therethrough become stabilized.

This smooth modulation of the average power delivered to the heating element 20A of the blanket 10A, by control over the portions of half cycles of alternating current which are passed through the main heating circuit, is to be contrasted with the control which has heretofore been used. As discussed above, the controls previously employed either averaged the power delivered over an extended period of time, by alternately applying power and removing power, or conducted portions of rectified current to a heating element, By way of contrast, control over the average power delivered by controlling the portion of each half cycle of alternating current which is conducted provides not only a broader ranging control but is substantially more precise and accurate in avoiding over shooting of set point temperatures.

Thyristors and similar semiconductor switch means under certain conditions may give rise to voltage transients which cause emission of radiant energy at radio frequencies. When emitted from a thyristor control, such radio frequency energy will interfere with and seriously impede the reception of conventional broadcasts by home entertainment radios and other radio receivers. Recognizing the possibility that such interference may result from use of the power control circuit of the present invention, it is preferred that the circuit include such resistance-capacitance and/or inductance components as are required to prevent interference with radio receiver devices in the area of use of the electrically heated bedcover. A choke or inductance L1 together with appropriate resistor and capacitors not specifically identified by reference characters are shown in the circuits of FIGS. 2, 3, 4, 6, 8 and 9 for accomplishing this purpose. It is to be noted that the choke L1 is in every instance preferably inserted in the circuit through which controlled portions of alternating line current flow to the blanket heating element, in parallel with the R–C timing circuit.

From the above discussion of circuitry including a control means 11A and blanket 10A of the first forms contemplated by the present invention, it is noted that no compensation is provided for variations in ambient temperature in the room in which the blanket or electrically heated bedcover is in use. Preferably, the temperature of a blanket is maintained substantially constant over a wide range of ambient temperature conditions, as over a range of approximately 25° F. As may be readily understood, the attainment of such operation requires that the rate of heat generation in the heating element 20A in the blanket 10A be varied as loss of heat from that element to the ambient surroundings varies. Thus, under conditions of relatively low ambient temperature, the average power delivered to the heating element 20A must be greater than that delivered under ambient conditions of high temperatures.

In order to better compensate for ambient temperature conditions, the second form of circuitry in the control means 11B includes a positive temperature coefficient resistance device 29B electrically connected in the gating signal means to control the resistance thereof and thereby control the phase relation of gating signals applied to the gate control element 22B of the semiconductor switching device 21A. By positioning the ambient temperature compensating resistance device 29B within the control means 11B, remote from the heating element 20A in the blanket 10A, terminal coupling between the ambient compensation resistance device 29A and the blanket is eliminated. Thus, the resistance device 29B is free to vary in resistance value in response to ambient temperature variations. Upon a rise in ambient temperature, the resistance value of the ambient compensation resistance device 29B rises, slowing the rise time of voltage at the trigger device 24B, changing the phase relation of the gating signals and thereby reducing the average power delivered to the main heating element 20A by reducing the portion of each half cycle of alternating line current during which the semiconductor switching means 21B is in the conductive state.

In an ambient temperature compensated gating signal circuit, as included in the second form of control means circuitry, a provision for varying the set point of the temperature beneath a bedcover is included by thermally biasing the ambient temperature compensating resistance device 29B, by thermally coupling the resistance device 29B to an ambient temperature compensation heating element 30B. The heating element 30B is positioned in fixed predetermined relation to the resistance device 29B, connected in parallel with the switching means 21B and the blanket heating element 20A and the rate of heat generation thereby is independent of the average power flow in the blanket heating circuit and controlled by a variable resistor 31B. By adjusting the variable resistor 31B, a user may control the extent to which thermal bias is applied to the ambient compensation resistance device 29B, and thereby control the warmth given off by the electrically heated bedcover.

It is contemplated that control over thermal biasing of an ambient temperature compensating resistance device may be attained by other means. Specifically, the third form of control means circuitry disclosed therein, the control means 11C (FIG. 4), provides an ambient compensation heating element 30C mounted for movement relative to the ambient compensation resistance device 29C. By moving a manually operable abutment device 32C mechanically engaging the movable ambient compensation heating element 30C, a user of the control box 11C may vary the thermal coupling between the ambient compensation heating element 30C and the associated resistance device 29C. Thus, while the rate of heat generation by the ambient compensating heating element 30C is constant, its effect on the ambient compensation resistance device 29C is controllably varied.

In all of the above-described circuit arrangements, protection against localized overheated conditions which may occur in the blanket 10 is provided by the plurality of positive temperature coefficient resistance devices 25A dispersed substantially throughout the heated area of the blanket 10A. It is contemplated by the present invention that protection against localized overheated conditions may be provided by any of the other various means known and used in the manufacture of electrically heated bedcovers and, by way of example, circuitry has been included to demonstrate the adaption of the principles of the present invention to two such alternative arrangements.

Referring now more particularly to the fourth form of control means wiring, contained in the control means 11D (FIG. 5), and to the second form of blanket wiring, contained in the blanket 10B (FIG. 6), it is contemplated that the present invention may be adapted to the use of heater wire which includes a pair of electrical signal conductors or electrodes as disclosed in U.S. Pat. Nos. 2,581,212; 2,846,559; and 2,846,560. Electrical heating wire incorporating such signal conductors and used electrically heated bedcovers has heretofore been manufactured and used commercially by the General Electric Company.

As more fully disclosed and discussed in the above identified U.S. patents, such structure includes a resistance heating wire 20B connected by conductors 14K, 14P and 15K, 15P and functioning as a heating element disposed within the blanket 10B and a pair of signal wires 34B, 35B connected by conductors 14L, 14M, 14N, 14O and 15L, 15M, 15N and 15O into the gating signal means circuit. The signal wires are wound about the heating element 20B and are normally electrically insulated from each other by a body of thermosensitive material 36B (shown schematically in FIG. 7 as a wavy line spanning the signal wires), referred to as a control layer. For purposes of clarity in the drawings, the signal wires and heating wire are shown schematically in FIG. 7 as running parallel, but it is to be understood that as actually constructed, the signal wires are wound about the heating wire.

In accordance with the teachings of the above-identified patents, the material 36B of the control layer exhibits substantial and predictable changes in one or more electrical characteristics with changes in temperature, thereby determining the electrical characteristics of the control layer so as to be capable of translation into a useful control effect. Specifically, variation in the resistance between the two signal conductors 34B, 35B is used in the circuitry of the control means 11B and blanket 10B to effectively vary the value of the capacitance in the R-C portion of the gating signal means and thereby vary the rise time of voltage applied to the trigger device 24D and thus the phase relation of gating signals to the gate control element 22D of a semiconductor switching means 21D. With variations in the voltage rise time, control is exercised over the average power delivered to the heating element in a manner similar to the circuits described above.

It is additionally contemplated that the power modulating control circuits of the present invention may be adapted for use for a more conventional electrical blanket construction, in which overheat protection is provided by means of a number of normally closed, positive temperature coefficient, bimetallic thermostats connected in series with the resistance heating wire in a blanket. Such circuit arrangements are shown in the control means 11E and 11F of FIGS. 8 and 9, for use in conjunction with the blanket 10C of FIG. 10. Beyond the distinction as to the particular overheat protection means employed, the operation of the power modulating control circuits 11E and 11F is substantially as described above with reference to FIGS. 3 and 4. That is, the total resistance present in an R-C timing circuit is determined by the resistance value of positive temperature coefficient resistance devices 29E and 29F, thermally biased by ambient temperature compensating heating elements 30E and 30F, respectively. The extent to which thermal bias is imposed is determined, in the first instance, by a variable resistance device 31E controlling current flow to the biasing heating element 30E and, in the second instance, by the spacing between the compensating heater and the ambient temperature compensating resistance device 29F.

In the drawings and specification, there have been set forth preferred embodiments of the invention, and although specific terms are employed, they are used in a generic and descriptive sense only and not for purposes of limitation.

We claim:

1. An electrically heated bedcover including a blanket and an electrical heating element in said blanket for generating heat upon the flow of electrical current therethrough, the improvement which comprises:

semiconductor switching means connected to said heating element for controlling electrical current flowing therethrough and including a gate control element, and gating signal means connected to said gate control element for applying low level gating signals thereto to trigger said semiconductor switching means from a nonconducting state into a conductive state and for controlling the average power delivered to said heating element, said gating signal means including a positive temperature coefficient resistance device responsive to change in temperature above and below a predetermined temperature indicative of the comfort of a user of the bedcover for modulating the phase relation of said gating signals to current applied to said semiconductor switching means in accordance with variations in the temperature to which said positive temperature coefficient device is exposed.

2. An electrically heated bedcover according to claim 1 and further comprising an adjustable variable resistance device connected in said gating signal means for manual variation of the resistance presented thereby and thus of the phase relation of gating signals applied to said gate control element so that a user of the bedcover may adjust the heating thereof to accommodate personal preferences as to warmth.

3. An electrically heated bedcover according to claim 1 wherein said semiconductor switching means is a bidirectional conducting device for controlled conduction of both half cycles of alternating current through said heating element.

4. An electrically heated bedcover according to claim 1 wherein said gating signal means further includes a voltage responsive triggering device connected to said gate control element of said semiconductor switching means for precluding conduction of a gating signal thereto until such time as the voltage across said triggering device exceeds a predetermined level.

5. An electrically heated bedcover according to claim 4 wherein said positive temperature coefficient resistance device is connected in a resistance-capacitance timing circuit portion of said gating signal means for determining the rise time of voltage across said triggering device.

6. An electrically heated bedcover according to claim 5 further including means for suppressing radio frequency radiation from operation of said semiconductor switching means and thereby protecting against interference with reception of radio broadcasts otherwise possible occuring during operation of the bedcover.

7. An electrically heated bedcover according to claim 1 wherein said gating signal means includes a plurality of positive temperature coefficient resistance devices, at least one of which is thermally insulated from said blanket heating element and exposed to ambient temperature conditions at the point of use of the bedcover, and further comprising an auxiliary set point heating means thermally coupled to said one positive temperature coefficient resistance device and an adjustable current flow limiting device operatively connected to said auxiliary heating means for controlling the flow of current therethrough and thus the rate of heat generation therein, said auxiliary heating means thermally biasing said one resistance device so that a user of the bedcover may adjust the heating thereof to accommodate personal preferences as to warmth.

8. In an electrically heated bedcover including a blanket and an electrical heating element in said blanket for generating heat upon the flow of electrical current therethrough, the improvement which comprises:
  semiconductor switching means connected to said blanket heating element for controlling electrical current flowing therethrough and including a gate control element,
  an ambient temperature compensating electrical heating element for generating heat upon flow of electrical current therethrough and connected in parallel with said switching means and said blanket heating element, and
  gating signal means connected to said gate control element of said semiconductor switching means for applying gating signals thereto for triggering said semiconductor switching means from a nonconductive state into a conductive state and for controlling the average power delivered to said blanket heating element, said gating signal means including a positive temperature coefficient resistance device thermally coupled to and biased by said ambient temperature compensating heating element and responsive to changes in temperature above and below a predetermined temperature indicative of the comfort of a user of the bedcover for modulating the phase relation of said gating signals to current applied to said semiconductor switching means in accordance with variations in the temperature to which said positive temperature coefficient device is exposed.

9. An electrically heated bedcover according to claim 8 wherein said gating signal means includes a plurality of positive temperature coefficient resistance devices disposed substantially throughout said blanket and responsive to the existence of a localized overheated condition of the bedcover for varying the phase relation of gating signals applied to said semiconductor switching means and thereby modulating the power delivered to said heating element toward a lower level.

10. An electrically heated bedcover according to claim 8 wherein said gating signal means includes a pair of signal wires in said blanket and a body of temperature sensitive material normally maintaining a predetermined resistance between said signal wires and responsive to a localized overheated condition of the bedcover for varying the phase relation of gating signals applied to said semiconductor switching means and thereby modulating the power delivered to said heating element toward a lower level.

11. An electrically heated bedcover including a blanket and an electrical heating element in said blanket for generating heat upon the flow of electrical current therethrough, the improvement which comprises:
  semiconductor, bidirectional conducting, switching means connected to said heating element for controlling both half cycles of alternating electrical current flowing therethrough and including a gate control element, and
  gating signal means connected to said gate control element for applying low level gating signals thereto to trigger said semiconductor switching means from a nonconductive state into a conductive state and for controlling the average power delivered to said heating element, said gating signal means including overheat protective means disposed in said blanket and responsive to the temperature thereof exceeding a predetermined temperature for modulating the phase relation of said gating signals to current applied to said semiconductor switching means, said overheat protective means being constructed and arranged to fail-safe by having the same effect, in the event of failure thereof, as an overheat condition.

UNITED STATES PATENT OFFICE
CERTIFICATE OF CORRECTION

Patent No. 3,588,446              Dated June 28, 1971

Inventor(s) Edwin R. Mills and Ernest L. Elmore

It is certified that error appears in the above-identified patent and that said Letters Patent are hereby corrected as shown below:

Column 3, Line 19, change "mean" to --means--. Column 5, Line 20, change "c" to --C--. Column 6, Line 75, change "terminal" to --thermal--. Column 7, Line 33, change "therein" to --herein-- same column, Line 66, after "used" insert --in--

Signed and sealed this 7th day of December 1971.

(SEAL)
Attest:

EDWARD M. FLETCHER, JR.      ROBERT GOTTSCHALK
Attesting Officer              Acting Commissioner of Patents